United States Patent
Biswas et al.

(10) Patent No.: US 11,061,652 B1
(45) Date of Patent: Jul. 13, 2021

(54) SYSTEM AND A METHOD FOR MOVING LEGACY APPLICATIONS TO CLOUD

(71) Applicant: Cognizant Technology Solutions India Pvt. Ltd., Chennai (IN)

(72) Inventors: Sekhar Ranjan Biswas, West Bengal (IN); Palash Doshi, Cumming, GA (US); Marcus Ansell, East Greenwich, RI (US)

(73) Assignee: COGNIZANT TECHNOLOGY SOLUTIONS INDIA PVT. LTD., Chennai (IN)

( * ) Notice: Subject to any disclaimer, the term of this patent is extended or adjusted under 35 U.S.C. 154(b) by 0 days.

(21) Appl. No.: 16/830,588

(22) Filed: Mar. 26, 2020

(51) Int. Cl.
G06F 9/45 (2006.01)
G06F 8/41 (2018.01)
G06F 16/2455 (2019.01)

(52) U.S. Cl.
CPC .............. G06F 8/425 (2013.01); G06F 8/427 (2013.01); G06F 8/437 (2013.01); G06F 8/447 (2013.01); G06F 16/2455 (2019.01)

(58) Field of Classification Search
CPC ................................................. G06F 8/40–447
USPC ......................................................... 717/144
See application file for complete search history.

(56) References Cited

U.S. PATENT DOCUMENTS

| | | | |
|---|---|---|---|
| 6,615,199 B1 | 9/2003 | Bowman-Amuah | |
| 7,003,764 B2 * | 2/2006 | Allison | G06F 8/425 707/999.006 |
| 7,334,223 B2 * | 2/2008 | Kumar | G06F 8/36 717/104 |
| 8,453,126 B1 * | 5/2013 | Ganelin | G06F 8/42 717/136 |
| 9,052,913 B2 * | 6/2015 | Kantamneni | G06F 8/43 |
| 9,244,982 B2 * | 1/2016 | Narayanan | G06F 16/24565 |
| 9,348,568 B2 * | 5/2016 | Zachariah | G06F 8/51 |
| 9,378,014 B2 * | 6/2016 | Wilson | G06F 8/36 |
| 9,405,518 B2 * | 8/2016 | Muldoon | G06F 8/447 |
| 10,019,259 B2 * | 7/2018 | Araya | G06F 8/76 |
| 10,162,610 B2 * | 12/2018 | Apte | G06F 8/51 |
| 10,572,230 B2 * | 2/2020 | Lucas | G06F 8/34 |

(Continued)

OTHER PUBLICATIONS

Oscar Rodriguez-Prieto et al. "An Efficient and Scalable Platform for Java Source Code Analysis using Overlaid Graph Representations"; IEEE Access—Received Feb. 25, 2020.*

(Continued)

*Primary Examiner* — Francisco J Aponte
(74) *Attorney, Agent, or Firm* — Cantor Colburn LLP

(57) ABSTRACT

The present invention provides for a system and a method for translating a legacy source code to a cloud native code. The present invention provides for receiving a source code and deriving a plurality of queries from the source code and the queries comprise a plurality of tokens. The present invention provides for constructing an abstract syntax tree in the form of a data structure from the tokens. The present invention provides for traversing the abstract syntax tree, the identified pattern, the scope table and the syntax table for translation of the tokens of the abstract syntax tree into new tokens stored in the form of a cloud native abstract syntax tree. The present invention provides for concatenating the new tokens stored in the cloud native abstract syntax tree to generate a translated cloud native code to be hosted on a cloud platform.

30 Claims, 8 Drawing Sheets

(56) References Cited

U.S. PATENT DOCUMENTS

| | | | |
|---|---|---|---|
| 10,620,925 B2* | 4/2020 | Paroski | G06F 8/447 |
| 10,824,404 B2* | 11/2020 | Zhang | H04L 67/10 |
| 10,846,083 B2* | 11/2020 | Hu | G06F 8/30 |
| 10,936,585 B1* | 3/2021 | Echeverria | G06N 5/00 |
| 2010/0324927 A1 | 12/2010 | Tinsley | |
| 2015/0154011 A1* | 6/2015 | Ceng | G06F 8/51 717/137 |
| 2015/0363177 A1* | 12/2015 | Shimamura | G06F 8/443 717/142 |
| 2018/0373507 A1* | 12/2018 | Mizrahi | G06N 7/00 |
| 2019/0050213 A1* | 2/2019 | Schanafelt | G06F 8/31 |
| 2019/0303141 A1* | 10/2019 | Li | G06F 16/9038 |
| 2020/0057781 A1* | 2/2020 | McCormick | G06F 16/81 |
| 2020/0167323 A1* | 5/2020 | Swamy | G06F 16/27 |
| 2020/0218533 A1* | 7/2020 | Sharma | G06F 11/3624 |
| 2020/0272458 A1* | 8/2020 | Guan | G06F 8/427 |
| 2020/0285451 A1* | 9/2020 | Agarwal | G06F 8/36 |
| 2020/0301686 A1* | 9/2020 | Games | G06F 8/30 |
| 2021/0029001 A1* | 1/2021 | Sen | G06F 8/433 |
| 2021/0096832 A1* | 4/2021 | Rich | G06F 40/211 |

OTHER PUBLICATIONS

Oscar Rodriguez-Prieto et al. "Graph Representations used in the design of ProgQuery (Technical Report)"; University of Oviedo, Computer Science Department, C/Federico Garcia Lorca 18, 33007, Oviedo, Spain—Feb. 25, 2020.*

Giovanni Toffetti et al. "Self-managing cloud-native applications: Design, implementation, and experience"; Future Generation Computer Systems 72 (2017) 165-179—Zurich University of Applied Sciences, School of Engineering, Service Prototyping Lab 8401 Winterthur, Switzerland.*

Umair Sabir, et al. "A Model Driven Reverse Engineering Framework for Generating High Level UML Models From Java Source Code"; Department of Computer and Software Engineering, College of Electrical and Mechanical Engineering, National University of Sciences and Technology,Islamabad, Pakistan—Nov. 13, 2019.*

* cited by examiner

SYSTEM AND A METHOD FOR MOVING LEGACY APPLICATIONS TO CLOUD

FIELD OF THE INVENTION

In an embodiment of the present invention, the present invention relates to a system and a method for moving a legacy source code to a cloud native code. More particularly, the present invention relates to a system and a method for translating a legacy application to a cloud native application based on pattern identification.

BACKGROUND OF THE INVENTION

In modern times, there is a need for managing and analyzing large volumes of data. However as the volume and variety of data has increased, cloud based services have been gaining prominence because of the features of data analytics. Traditional technology fails to meet the needs of today's business users, such as increasing requirement for unlimited concurrency and performance. Data modernization to various distributed platforms has reshaped the information technology (IT) industry and is a major task as enterprise move their data to cloud and distributed systems.

As organizations seek to exploit massive new data streams, legacy mainframes and data warehouses often become too expensive and slow to keep up. Legacy application data processing costs, including software licensing and support, can run millions of dollars per year, while storage directly attached to the legacy data warehouse is also far more expensive than current cloud-based solutions. Legacy data warehouse platforms can become unacceptably expensive as organizations upgrade them to meet rising data volumes and analytics needs. As such, there is always a risk involved while updating or modifying the source code of the legacy systems. Further, it has been observed that the legacy platforms are also unable to effectively share and process data from all sources required for today's big data requirements, such as social media and internet of things sensors.

Just like software itself, the underlying infrastructure of the legacy systems becomes a lot more expensive to maintain. The legacy systems often require a specific technical environment, including hardware. Thus, the infrastructure maintenance spending in the legacy systems remains high, as compared to modern cloud-based solutions. Being scattered across several databases and storage resources, it has been observed that it is difficult to reorganize the data associated with the legacy based systems for increased storage space optimization. Further, gathering and systematizing legacy data manually to further transfer the data to a new database in a time- and cost-intensive task.

Furthermore, typically, migration team needs to analyze and determine the best approach for transforming the legacy application to cloud based on trial and error. This is, however a very long and time-consuming process. Further, the legacy application migration to cloud requires intensive manual processes and steps that could extend up to a few months depending on the complexity. It has been observed that existing techniques of moving legacy application to cloud is predominantly a manual, error-prone process often resulting in high rework and maintenance efforts.

In view of the above, there is a need for a system and a method for efficiently interpreting legacy source code and translating the same into a cloud native code. There is a need for a system and a method of cloud migration with minimum human intervention. Further, there is also a need for reducing duration of application to cloud transformation.

SUMMARY OF THE INVENTION

In various embodiments of the present invention, a system for translating a legacy source code to a cloud native code is provided. The system comprises a memory storing program instructions and a processor executing program instructions stored in the memory. The system comprises a source code translation engine executed by the processor and configured to receive a source code and derive a plurality of queries from the source code. The queries comprise a plurality of tokens. The source code translation engine is configured to construct an abstract syntax tree in the form of a data structure from the tokens. The source code translation engine is configured to identify a syntax of the queries stored in the abstract syntax tree. The syntax is stored in the form of syntax identifiers in a syntax table. The source code translation engine is configured to identify a scope of the queries stored in the abstract syntax tree. The scope is stored in the form of scope identifiers in a scope table. The source code translation engine is configured to concatenate the tokens in the queries stored in the abstract syntax tree for identification of a pattern. Further, the source code translation engine is configured to traverse the abstract syntax tree, the identified pattern, the scope table and the syntax table for translation of the tokens of the abstract syntax tree into new tokens stored in the form of a cloud native abstract syntax tree. The source code translation engine is configured to concatenate the new tokens stored in the cloud native abstract syntax tree to generate a translated cloud native code to be hosted on a cloud platform.

In various embodiments of the present invention, a method for translating a legacy source code to a cloud native code executed by a processor comprising program instructions stored in a memory is provided. The method comprises receiving a source code and deriving a plurality of queries from the source code where the queries comprise a plurality of tokens. The method comprises constructing an abstract syntax tree in the form of a data structure from the tokens. The method comprises identifying a syntax of the queries stored in the abstract syntax tree. The syntax is stored in the form of syntax identifiers in a syntax table. The method comprises identifying a scope of the queries stored in the abstract syntax tree where the scope is stored in the form of scope identifiers in a scope table. The method comprises concatenating the tokens in the queries stored in the abstract syntax tree for identification of a pattern. The method comprises traversing the abstract syntax tree, the identified pattern, the scope table and the syntax table for translation of the tokens of the abstract syntax tree into new tokens stored in the form of a cloud native abstract syntax tree. The method comprises concatenating the new tokens stored in the cloud native abstract syntax tree to generate a translated cloud native code to be hosted on a cloud platform.

In various embodiments of the present invention, a computer program product is provided. The computer program product comprises a non-transitory computer readable medium having computer-readable program code stored thereon, the computer readable program code comprising instructions that, when executed by a processor, cause the processor to receive a source code and derive a plurality of queries from the source code, wherein the queries comprise a plurality of tokens. An abstract syntax tree is constructed in the form of a data structure from the tokens. A syntax is identified of the queries stored in the abstract syntax tree.

The syntax is stored in the form of syntax identifiers in a syntax table. A scope of the queries is identified that is stored in the abstract syntax tree. The scope is stored in the form of scope identifiers in a scope table. The tokens are concatenated in the queries stored in the abstract syntax tree for identification of a pattern. The abstract syntax tree, the identified pattern, the scope table and the syntax table are traversed for translation of the tokens of the abstract syntax tree into new tokens stored in the form of a cloud native abstract syntax tree. The new tokens are concatenated that are stored in the cloud native abstract syntax tree to generate a translated cloud native code to be hosted on a cloud platform.

BRIEF DESCRIPTION OF THE ACCOMPANYING DRAWINGS

The present invention is described by way of embodiments illustrated in the accompanying drawings wherein.

DETAILED DESCRIPTION OF THE INVENTION

The disclosure is provided in order to enable a person having ordinary skill in the art to practice the invention. Exemplary embodiments herein are provided only for illustrative purposes and various modifications will be readily apparent to persons skilled in the art. The general principles defined herein may be applied to other embodiments and applications without departing from the spirit and scope of the invention. The terminology and phraseology used herein is for the purpose of describing exemplary embodiments and should not be considered limiting. Thus, the present invention is to be accorded the widest scope encompassing numerous alternatives, modifications and equivalents consistent with the principles and features disclosed herein. For purposes of clarity, details relating to technical material that is known in the technical fields related to the invention have been briefly described or omitted so as not to unnecessarily obscure the present invention.

The present invention would now be discussed in context of embodiments as illustrated in the accompanying drawings.

Figure 1:
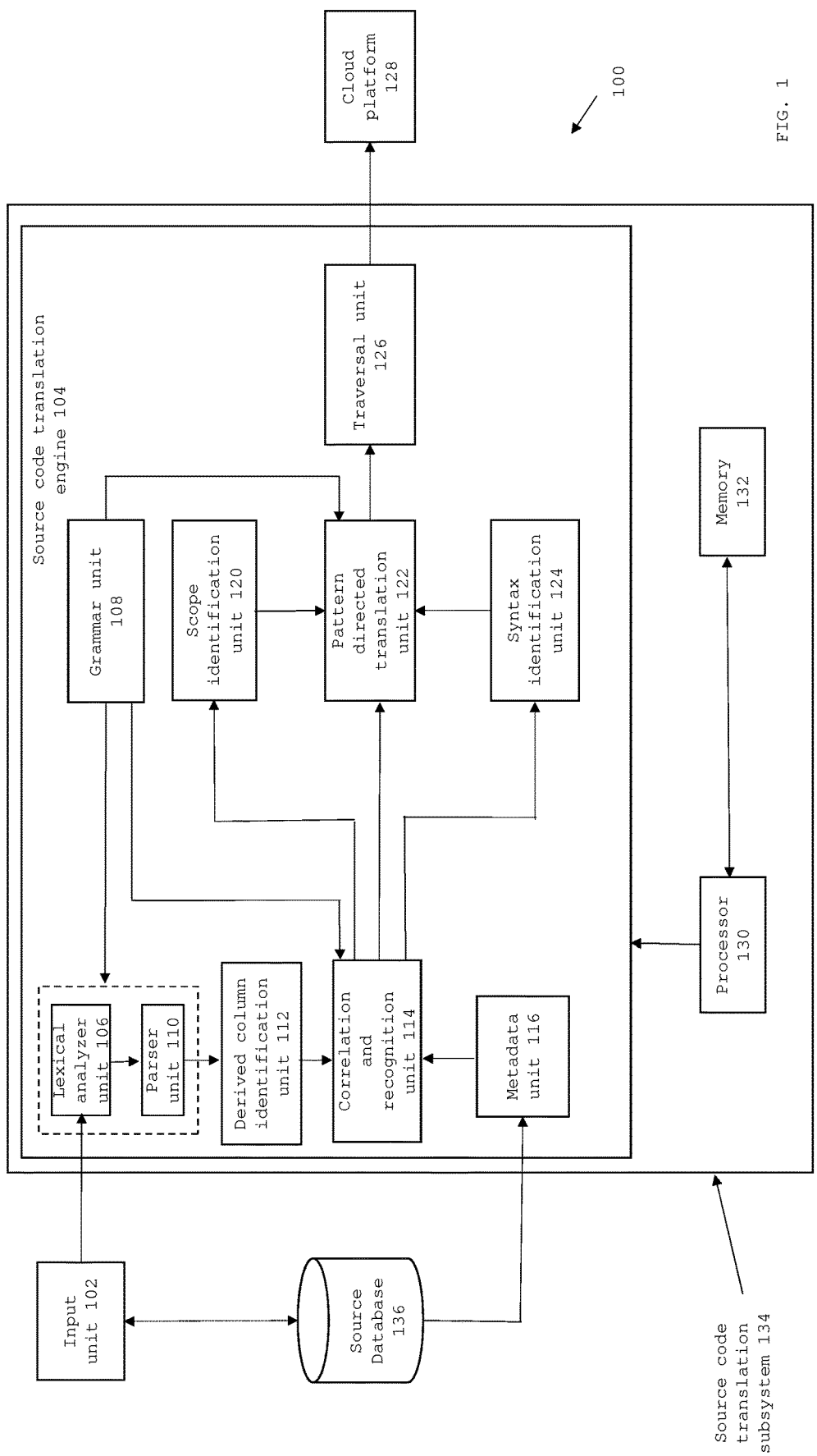
FIG. 1 is a block diagram of a system for translating a source code to a cloud native code, in accordance with an embodiment of the present invention.

FIG. 1 is a block diagram of a source code translation system 100 for translation of a source code to a cloud native code, in accordance with an embodiment of the present invention. Referring to FIG. 1, in an embodiment of the present invention, the system 100 comprises an input unit 102, a source code translation subsystem 134 and a cloud platform 128. The source code translation subsystem 134 is configured to receive the source code via the input unit 102. In an exemplary embodiment of the present invention, the input unit 102 is configured to receive inputs from a user via a graphical user interface. The source code translation subsystem 134 is configured to translate the source code received from the input unit 102 into a cloud native code. In an exemplary embodiment of the present invention, the code may be deployed in an amazon web services (AWS) cloud platform 128. In another embodiment of the present invention, the translated code may be deployed in a Microsoft azure cloud platform 128. In another embodiment of the present invention, the translated code may be deployed in a Google cloud platform 128. In yet another exemplary embodiment of the present invention, the translated code may be deployed in a pivotal cloud foundry (PCF) cloud platform 128. In another exemplary embodiment of the present invention, the translated code may be deployed in a Red Hat OpenShift cloud platform 128.

The input unit 102 communicates with the source code translation subsystem 134 via a communication channel (not shown). Further the source code translation subsystem 134 communicates with the cloud platform 128 via a communication channel (not shown). In an embodiment of the present invention, the communication channel (not shown) may include, but is not limited to, a physical transmission medium, such as, a wire, or a logical connection over a multiplexed medium, such as, a radio channel in telecommunications and computer networking. Examples of radio channel in telecommunications and computer networking may include, but are not limited to, message queues, HTTPS API calls, a local area network (LAN), a metropolitan area network (MAN) and a wide area network (WAN).

In an embodiment of the present invention, the source code translation subsystem 134 comprises a source code translation engine 104, a processor 130 and a memory 132. In an embodiment of the present invention, the source code translation engine 104 has multiple units which work in conjunction with each other for automatic translation of the input source code into a cloud native code. The various units of the source code translation engine 104 are operated via the processor 130 specifically programmed to execute instructions stored in the memory 132 for executing respective functionalities of the units of the engine in accordance with an embodiments of the present invention. The source code translation engine 104 further comprises a lexical analyzer unit 106, a parser unit 110, a grammar unit 108, a derived column identification unit 112, a correlation and recognition unit 114, a metadata unit 116, a scope identification unit 120, a pattern directed translation unit 122, a syntax identification unit 124 and a traversal unit 126.

In another embodiment of the present invention, the subsystem 134 may be implemented as a client-server architecture. In this embodiment of the present invention, a client terminal accesses a server hosting the subsystem 134 over a communication network. The client terminals may include, but are not limited to, a computer, microcomputer or any other wired terminal. The server may be a centralized or a decentralized server.

Figure 2:
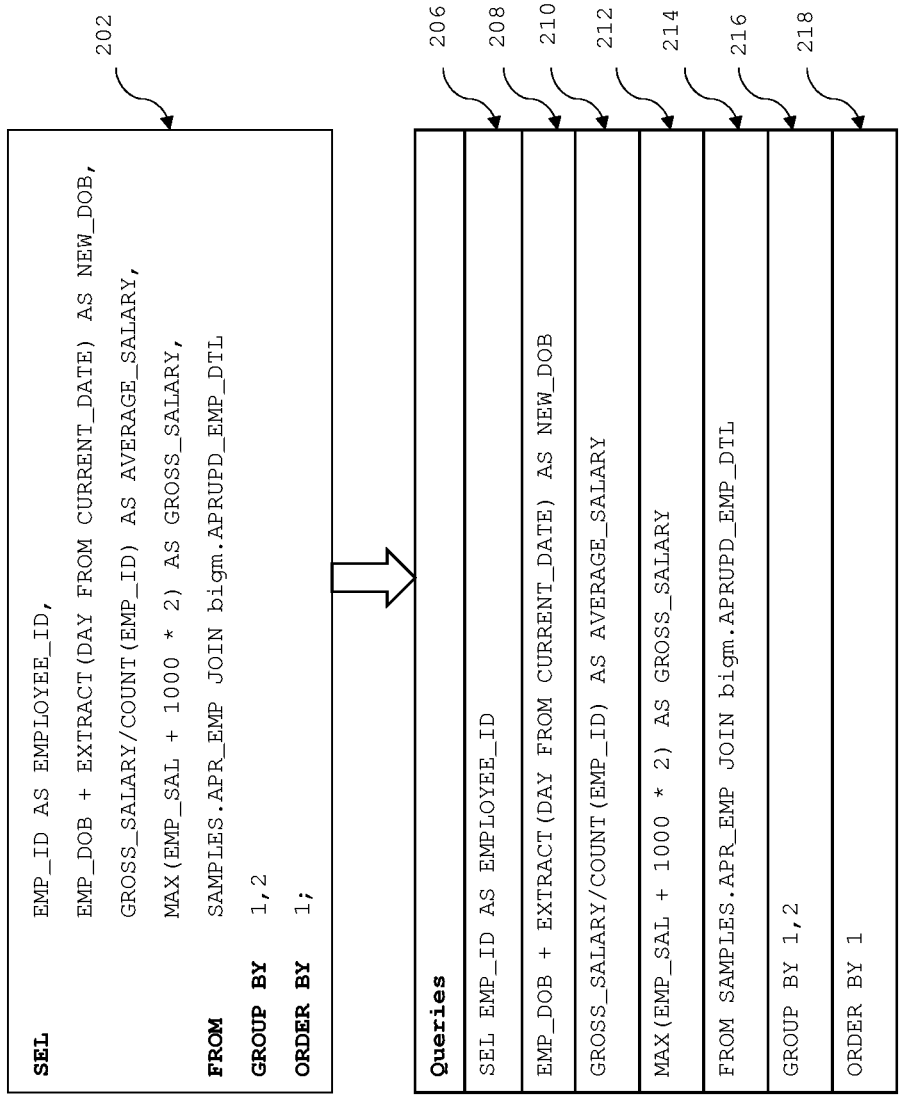
FIG. 2 illustrates an input source code and its conversion to a plurality of queries, in accordance with an embodiment of the present invention.

In an embodiment of the present invention, the source code translation engine 104 receives the source code from the input unit 102 interfacing a source database 136. Examples of the source database 136 may include, but is not limited to, Teradata, Oracle, Netezza, Hadoop, Mainframe etc. The source code translation engine 104 is configured with a built-in-intelligent mechanism for automatic translation of the legacy source code into a cloud native code. In an example, the source code is received in the form of a script 202 as shown in FIG. 2.

In an embodiment of the present invention, the lexical analyzer unit 106 of the source code translation engine 104 is configured to divide the source code received from the input unit 102 into a plurality of queries. Further, the queries comprise a series of tokens. In an exemplary embodiment of the present invention, the series of tokens may be identifiers, keywords, separators, operators, literals, comments, whitespaces, new lines, series of characters etc. In an embodiment of the present invention, the grammar unit 108 is configured to define each token based on the definitions of tokens that are pre-stored in the grammar unit 108. In an example, the query 206 as shown in FIG. 2 may comprise a plurality of tokens i.e. SEL, EMP_ID, AS, EMPLOYEE_ID.

Figure 3:
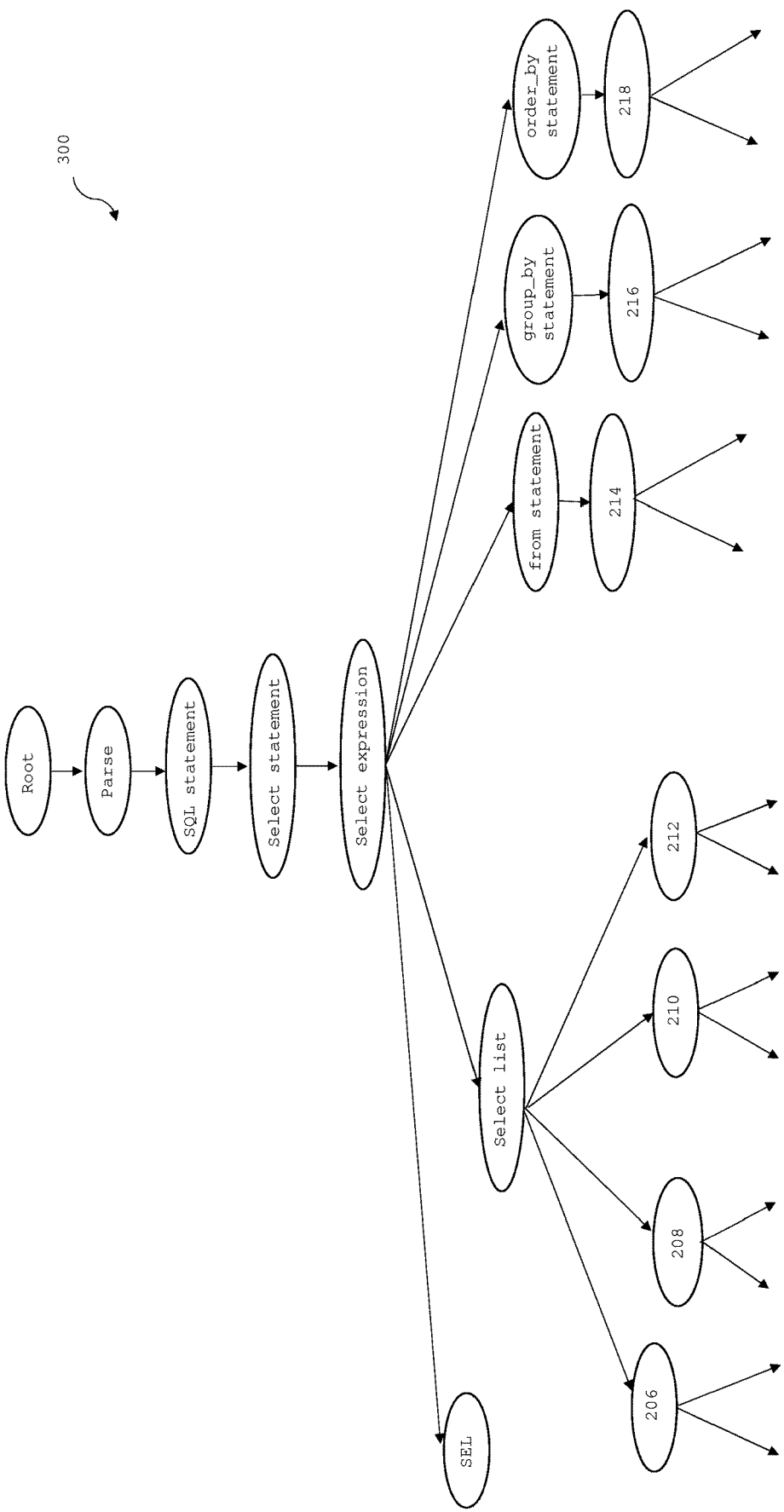
FIG. 3 illustrates an abstract syntax tree constructed by a parser unit, in accordance with an embodiment of the present invention.

In an embodiment of the present invention, the parser unit 110 of the source code translation engine 104 receives input in form of the queries comprising series of tokens received from the lexical analyzer unit 106. The parser unit 110 is configured to construct a data structure in the form of an abstract syntax tree using the queries. In another embodiment of the present invention, the parser unit 110 is configured to check whether the sequence of tokens in the queries form a meaningful expression using the grammar as stored in the grammar unit 108. In an example, the abstract syntax tree constructed by the parser unit 110 is shown in FIG. 3. The abstract syntax tree 300 may comprise different nodes representing different queries of the input source code. In another embodiment of the present invention, the abstract syntax tree 300 comprises several nodes representing the queries comprising tokens. In another embodiment of the present invention, the grammar unit 108 contains a grammar file comprising grammar of the languages specific to input source code. In an embodiment of the present invention, the grammar file is a text file. In another embodiment of the present invention, the grammar file is a source specific file which comprises a source code specific version. In an embodiment of the present invention, multiple nodes of the abstract syntax tree may have a child-parent relationship with the other nodes. In an embodiment of the present invention, the child parent relationship of the nodes of the tree may be stored in the form of an array in a stack.

Figure 4:
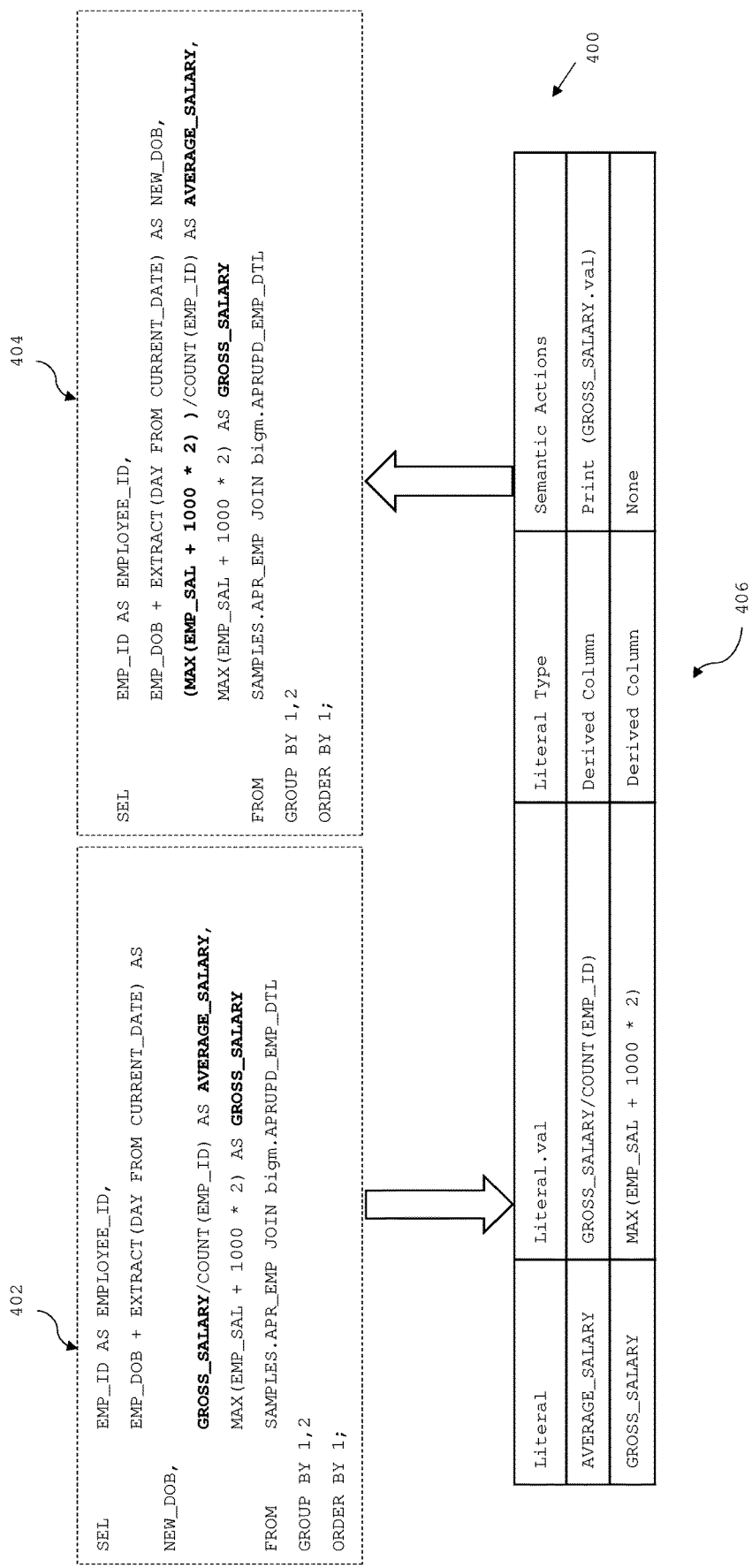
FIG. 4 illustrates an updated source code corresponding to an updated abstract syntax tree, in accordance with an embodiment of the present invention.

In another embodiment of the present invention, the derived column identification unit 112 of the code translation engine 104 is configured to derive a literal information relating to a query or nested queries (queries within queries) stored in the abstract syntax tree received from the parser unit 110. FIG. 4 shows the derivation of multiple derived literals out of the input source code stored in the abstract syntax tree. As shown in FIG. 4, the input script 402 includes the derived literal "AVERAGE_SALARY" as occurring in line #3 of the source code 402 and it references derived column "GROSS_SALARY/COUNT(EMP_ID)". Further, "GROSS_SALARY" occurs in line #4 and it references literal "MAX(EMP_SAL+1000*2)". The derived column identification unit 112 is configured to resolve "top-down" usage of derived literal to make the input source code compatible with the target cloud platform 128 as a few of the target cloud platforms 132 do not support top-down usage of the derived literal, i.e. "GROSS_SALARY" as used in Line #4 and within an expression in Line #3 of FIG. 4 (402). The derived column identification unit 112 is configured to resolve "top-down" usage of derived literal to make it compatible with a target cloud platform 128.

In an embodiment of the present invention, while traversing the abstract syntax tree, the derived column identification unit 112 is configured to create a vector for all derived literals along with its values. The vector is a temporary data structure which store information about all the literals and all its values. In an example, the vector is shown as below:

| Literal | Literal.val |
| --- | --- |
| AVERAGE_SALARY | GROSS_SALARY/COUNT(EMP_ID) |
| GROSS_SALARY | MAX(AVERAGE_SALARY + 1000 * 2) |

During traversing of the abstract syntax tree, the derived column identification unit 112 is configured to traverse the vector as shown above iteratively to resolve all the derived literals using top-down parsing with new values. In an example, before iteration, vector structure is shown below:

| Literal | Literal.val | Literal Type | Semantic Actions |
| --- | --- | --- | --- |
| AVER-AGE_SALARY | GROSS_SALARY/ COUNT(EMP_ID) | Derived Literal | Print (GROSS_SAL-ARY.val) |
| GROSS_SALARY | MAX(EMP_SAL + 1000 * 2) | Derived Literal | None |

After iteration, the vector structure is shown below:

| Literal | Literal.val | Literal Type | Literal.val.new | Remarks |
| --- | --- | --- | --- | --- |
| AVERAGE_SALARY | GROSS_SALARY/ COUNT(EMP_ID) | Derived Literal | MAX(EMP_SAL + 1000 * 2)/ COUNT(EMP_ID) | Resolved GROSS_SALARY |
| GROSS_SALARY | MAX(EMP_SAL + 1000 * 2) | Derived Literal | MAX(GROSS_SAL-ARY/COUNT(EMP_ID) + 1000 * 2) | |

In an embodiment of the present invention, the derived column identification unit 112 is configured to attach all the new literal values for all derived literals in multiple iterations (as shown above). The derived column identification unit 112 is configured to update the abstract syntax tree using the vector as shown in FIG. 4. FIG. 4 shows the input application source code 402 relating to the abstract syntax tree and the vector structure 406 and the updated application source code 404 that is stored in the updated abstract syntax tree. In an embodiment of the present invention, the derived column identification unit 112 is configured to traverse the abstract syntax tree from top node to bottom node recursively.

Figure 5:
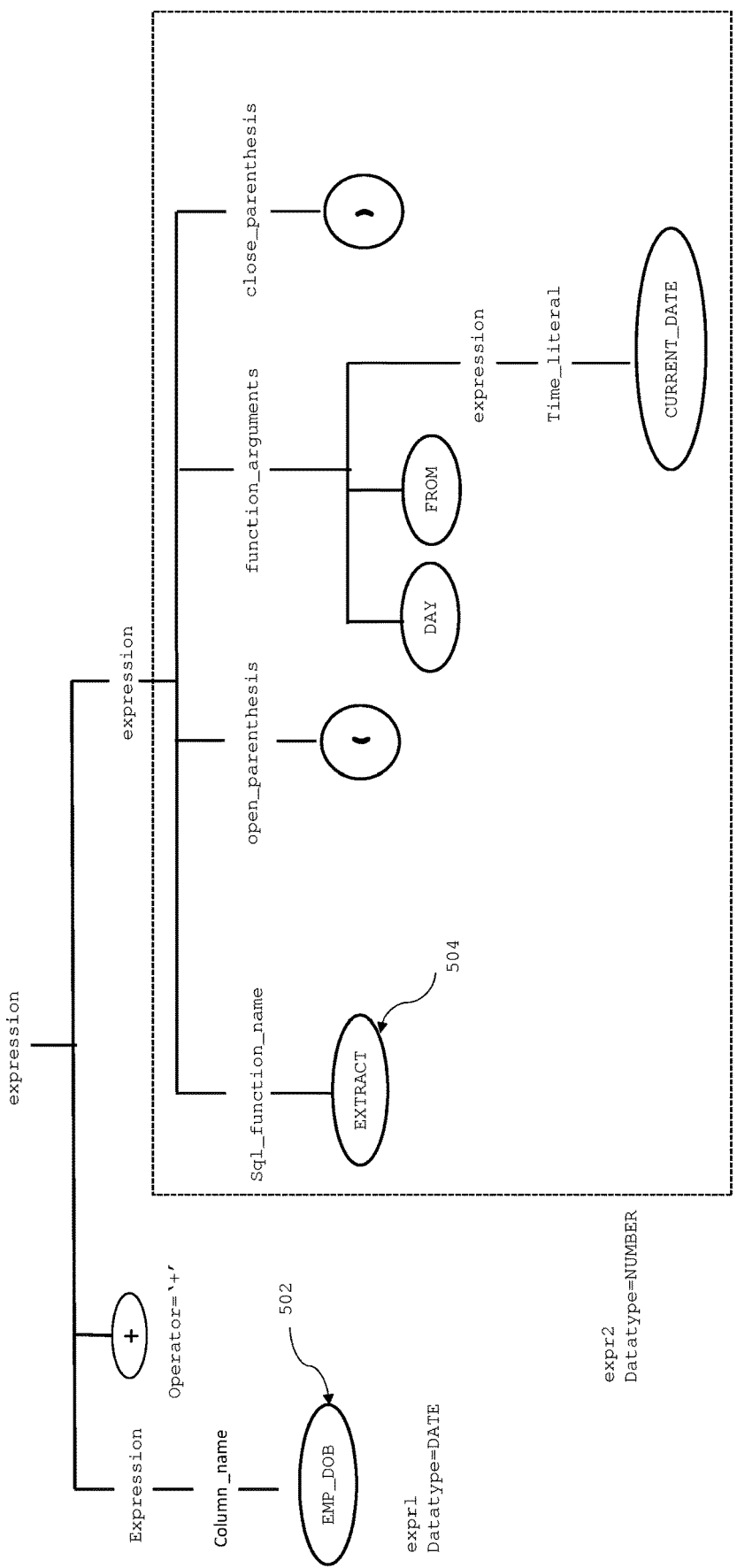
FIG. 5 illustrates an updated abstract syntax tree corresponding to a query, in accordance with an embodiment of the present invention.

In an embodiment of the present invention, the correlation and recognition unit 114 of the source code translation engine 104 is configured to determine a datatype of operands in the queries stored in the nodes of the updated abstract syntax tree. In an example, the updated abstract syntax tree as shown in FIG. 5 applies a numeric operand '+' on token 'EMP_DOB'. The operand '+' applies different rules depending on the datatype of its left and right tokens or expressions. The correlation and recognition unit 114 identifies the datatypes of the left token 'EMP_DOB' 502 and right token 'EXTRACT (DAY FROM CURRENT_DATE)' 504 before identifying the appropriate rule to be applied on tokens. In an embodiment of the present invention, the appropriate rule may be stored in the grammar unit 108 corresponding to the identified operands and the corresponding right and left tokens.

FIG. 5 shows a generated abstract syntax tree from the 'EMP_DOB+EXTRACT (DAY FROM CURRENT_DATE)' of the updated source code 404 in an embodiment of the present invention. In an embodiment of the present invention, the correlation and recognition unit 114 is configured to traverse the various nodes of the updated abstract syntax tree and identify non-qualified expressions of the updated source code stored in the updated abstract syntax tree. The non-qualified expression are the expressions where the child nodes of the query is unknown. In an example, the non-qualified expressions include 'nested' expressions e.g. 'nested' keywords, 'nested' functions along with remarks, comments, newlines etc. In another embodiment of the present invention, the correlation and recognition unit 114 is configured to traverse the various nodes of the updated abstract syntax tree and identify the non-qualified operators and expressions of the nested queries stored in updated abstract syntax tree.

While traversing the updated abstract syntax tree, the correlation and recognition unit 114 of the source code, translation engine 104 is configured to generate a 'temp map'. The 'temp map' is a temporary data structure that stores information associated with the datatype of each of the expressions of the nested queries of the updated source code stored in the updated abstract syntax tree. In an example, the 'temp map' for the updated source code stored in the updated abstract syntax tree is shown below:

| Literal Value | Literal Type | Attribute1 |
|---|---|---|
| EMP_ID | Column Name | Table-name = None |
| EMP_DOB | Column Name | Table-name = None |
| EMP_SAL | Column Name | Table-name = None |

In an embodiment of the present invention, the metadata unit 116 is configured to capture metadata information e.g. table format, column format, datatype etc. from the source database 136 and is further configured to populate the captured metadata in the 'temp map'. The metadata unit 116 is configured to extract metadata from the source database 136 in a metadata table as shown below:

| Literals | Literal Type | Attribute1 |
|---|---|---|
| Col1 | Column Name | Table-name = APR_EMP |
| . . . | Column Name | Table-name = APR_EMP |
| EMP_ID | Column Name | Table-name = APR_EMP |
| . . . | . . . | . . . |
| Col2 | Column Name | Table-name = APRUPD_EMP_DTL |
| . . . | . . . | . . . |
| EMP_DOB | Column Name | Table-name = APRUPD_EMP_DTL |
| EMP_SAL | Column Name | Table-name = APRUPD_EMP_DTL |

In an embodiment of the present invention, the correlation and recognition unit 114 is configured to compare the 'temp map' with the metadata table based on the determined datatype of the operands. In another embodiment of the present invention, the metadata unit 116 is configured to populate the metadata from the metadata table into the 'temp map'. In an embodiment of the present invention, the metadata unit 116 is configured to capture metadata information e.g. table format, column format, datatype etc. from the source database 136 and is further configured to populate the captured metadata in the 'temp map'. In another embodiment of the present invention, the metadata unit 116 is configured to traverse the updated abstract syntax tree and determine the metadata to be extracted from the source database 136 corresponding to the tables used in the 'temp map'.

In an example, the updated 'temp map' is shown as below:

| Literal Value | Literal Type | Attribute1 |
|---|---|---|
| EMP_ID | Column Name | Table-name = APR_EMP |
| EMP_DOB | Column Name | Table-name = APRUPD_EMP_DTL |
| EMP_SAL | Column Name | Table-name = APRUPD_EMP_DTL |

After the 'temp map' is updated, the 'temp map' is used to populate the metadata into the updated abstract syntax tree such that the metadata is reflected in the updated abstract syntax tree.

In an embodiment of the present invention, the syntax identification unit 124 of the code translation engine 104 is configured to traverse the updated abstract syntax tree received from the correlation and recognition unit 114 and further configured to identify the syntax corresponding to the queries stored in the nodes of the updated abstract syntax tree. In another embodiment of the present invention, the syntax identification unit 124 is configured to store the identified syntaxes in a table corresponding to each syntax and query of the updated abstract syntax tree in form of syntax identifiers. The syntax may comprise of a unique set of guidelines like punctuation, spaces, mathematical operators, and special characters stored in the updated abstract syntax tree. In another embodiment of the present invention, the syntax identification unit 124 is configured to identify a recursive pattern of syntax which comprises of groups of tokens.

In an embodiment of the present invention, the scope identification unit 120 of the code translation engine 104 is configured to extract the scope out of the updated abstract syntax tree received from the correlation and recognition unit 114. In another embodiment of the present invention, the scope identification unit 120 is further configured to perform analysis of the different nodes of the updated abstract syntax tree to analyze the scope of the updated source code stored in the updated abstract syntax tree. During analysis, the scope identification unit 120 is configured to record the tokens of the updated application source code stored in the updated abstract syntax tree along with additional attributes e.g. name, type, scope, initialization etc. of the tables stored in the updated source code. For a multilevel nested subquery, the scope includes scope of a child node and a parent node of the query stored in the updated abstract syntax tree.

In another embodiment of the present invention, the scope identification unit 120 is configured to identify the scope of the tokens in the updated queries stored in the updated abstract syntax tree and store the scope of the updated queries and tokens in a scope table with a scope identifier for each updated query and token of the updated source code stored in the updated abstract syntax tree. In an embodiment of the present invention, the scope identification unit 120 is configured to identify a recursive pattern which comprises of group of tokens and a scope associated with the recursive patterns in the updated abstract syntax tree. In an embodiment of the present invention, the scope identification unit 120 is configured to perform hierarchical analysis of different nodes from the top node to the bottom node and left node to the right node of the updated abstract syntax tree to analyze the scope of the tokens i.e. the portion of a query in which that token is accessible. In an exemplary embodiment of the present invention, a source code language like Teradata supports dynamic scoping where the same token is re-defined within different sections of the same source code. In an embodiment of the present invention, the correlation and recognition unit 114 is configured to identify the token re-definition and store the scoping of the token re-defined within the source code in the scope table in form of the scope identifier.

In an embodiment of the present invention, the pattern directed translation unit 122 is configured to traverse the updated abstract syntax tree from top node to bottom node and then from left node to right node. The pattern directed translation unit 122 is configured to traverse through all the nodes of the abstract syntax tree and identify the tokens stored in the nodes of the updated abstract syntax tree. In an embodiment of the present invention, the pattern directed translation unit 122 is configured to concatenate recursively various tokens stored in the updated syntax tree to generate a concatenated token string. In an embodiment of the present invention, the pattern directed translation unit 122 is configured to identify the pattern by matching the concatenated token string with respect to various preloaded patterns stored in the grammar unit 108.

In an example, during traversal of the abstract syntax tree, the pattern directed translation unit 112 is configured to identify all the nodes of the updated abstract syntax tree having node-type as 'expression' and then identify the token type. The token type is associated as an attribute of the token's child. During pattern identification, the pattern directed translation unit 122 concatenates various tokens recursively to identify the pattern. This recursive concatenation of all tokens continue till the traversal routine reaches 'select expression' node. Once the traversal routine reaches the 'select expression' node, it stops token concatenation and identifies the pattern by matching the 'concatenated token string' w.r.t various preloaded patterns stored in the grammar unit 108.

In an embodiment of the present invention, the pattern directed translation unit 126 is configured to traverse the updated abstract syntax tree received from the correlation and recognition unit 114, the scope table received from the scope identification unit 120, the syntax table received from the syntax identification unit 124 and the identified pattern to translate the tokens stored in the updated abstract syntax tree into new tokens stored in form of a cloud native abstract syntax tree. In an embodiment of the present invention, the new tokens correspond to a cloud native code. The pattern directed translation unit 126 is configured to compare the identified pattern, the scope table and the syntax table with each node of the updated syntax tree to translate the updated abstract syntax tree into the cloud native abstract syntax tree. In an embodiment of the present invention, the cloud native abstract syntax tree comprises cloud native queries that may be hosted on the cloud platform 128. In an embodiment of the present invention, the pattern directed translation unit 122 is configured to traverse the updated abstract syntax tree received from the correlation and recognition unit 114 from top node to bottom node and then from left node to right node to compare the queries stored in the nodes with the identified pattern, the scope table and the syntax tree for translation of the tokens stored in the updated abstract syntax tree into new tokens stored in form of a cloud native abstract syntax tree.

In an embodiment of the present invention, the traversal unit 126 of the code translation engine is configured to traverse the cloud native abstract syntax tree received from the pattern directed translation unit 122 and generate a cloud native code to be hosted on the cloud platform 128. During the traversal of the cloud native abstract syntax tree, the pattern directed translation unit 122 is configured to concatenate the new tokens stored in the cloud native abstract syntax tree and generate a translated cloud native code to be hosted on the cloud platform 128.

Figure 6A:
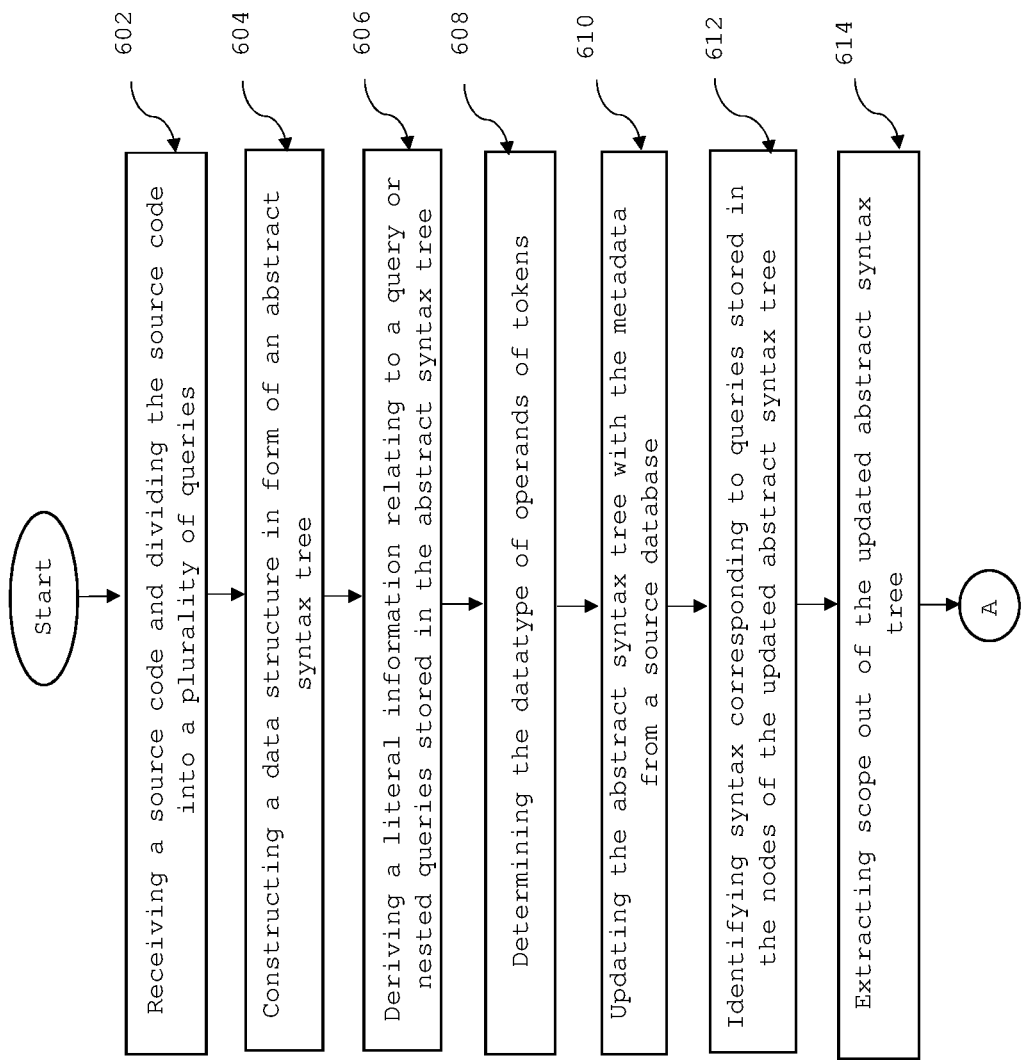
FIG. 6A and FIG. 6B illustrates a flowchart for translating a legacy source code to a cloud native code, in accordance with various embodiments of the present invention.
Figure 6B:
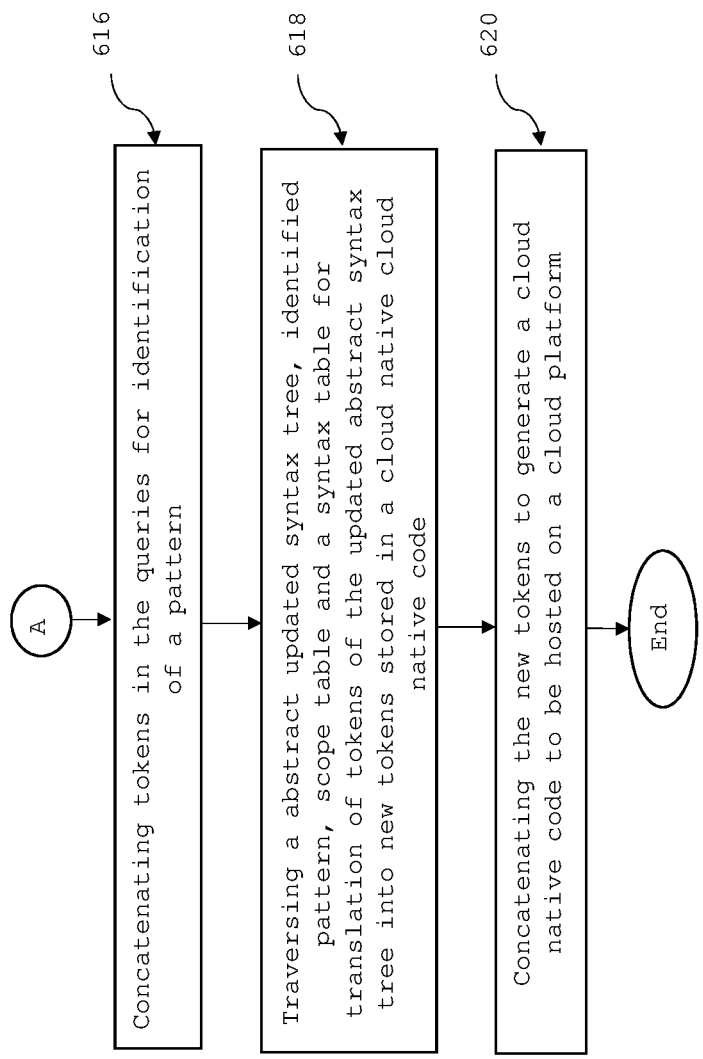

FIG. 6A and FIG. 6B illustrates a flowchart for translating a legacy source code to a cloud native code, in accordance with various embodiments of the present invention.

At step 602, a source code is received and the source code is divided into a plurality of queries. Examples of the source database may include, but is not limited to, Teradata, Oracle, Netezza, Hadoop, Mainframe etc. The source code translation engine is configured with a built-in-intelligent mechanism for automatic translation of the legacy source code into a cloud native code. Further, the queries comprise a series of tokens. In an exemplary embodiment of the present invention, the series of tokens may be identifiers, keywords, separators, operators, literals, comments, whitespaces, new lines, series of characters etc. In an embodiment of the present invention, the grammar unit is configured to define each token based on the definitions of tokens that are pre-stored in the grammar unit.

At step 604, a data structure is constructed in form of an abstract syntax tree. The parser unit is configured to construct a data structure in the form of an abstract syntax tree using the queries. In another embodiment of the present invention, the parser unit is configured to check whether the sequence of tokens in the queries form a meaningful expression using the grammar as stored in the grammar unit. The abstract syntax tree may comprise different nodes representing different queries of the input source code. In another embodiment of the present invention, the abstract syntax tree comprises several nodes representing the queries comprising tokens. In another embodiment of the present invention, the grammar unit contains a grammar file comprising grammar of the languages specific to input source code. In an embodiment of the present invention, the grammar file is a text file. In another embodiment of the present invention, the grammar file is a source specific file which comprises a source code specific version. In an embodiment of the present invention, multiple nodes of the abstract syntax tree may have a child-parent relationship with the other nodes. In an embodiment of the present invention, the child parent relationship of the nodes of the tree may be stored in the form of an array in a stack.

At step 606, a literal information is derived relating to a query or nested queries stored in the abstract syntax tree. In an embodiment of the present invention, a literal information is derived relating to a query or nested queries (queries within queries) stored in the received abstract syntax tree. FIG. 4 shows the derivation of multiple derived literals out of the input source code stored in the abstract syntax tree. As shown in FIG. 4, the input script includes the derived literal "AVERAGE_SALARY" as occurring in line #3 of the source code and it references derived column "GROSS_SALARY/COUNT(EMP_ID)". Further, "GROSS_SALARY" occurs in line #4 and it references literal "MAX(EMP_SAL+1000*2)". The derived column identification unit 112 is configured to resolve "top-down" usage of derived literal to make it compatible with the target cloud platform as a few of the target cloud platforms do not support top-down usage of the derived literal, i.e. "GROSS_SALARY" as used in Line #4 and within an expression in Line #3 of FIG. 4. The derived column identification unit is configured to resolve "top-down" usage of derived literal to make it compatible with a target cloud platform. In an embodiment of the present invention, while traversing the abstract syntax tree, the derived column identification unit 112 is configured to create a vector for all derived literals along with its values. The vector is a temporary data structure which store information about all the literals and all its values. During traversing of the abstract syntax tree, the derived column identification unit is configured to traverse the vector iteratively to resolve all the derived literals using top-down parsing with new values. In an embodiment of the present invention, all the new literal values are attached for all derived literals in multiple iterations. The derived column identification unit is configured to update the abstract syntax tree using the vector as shown in FIG. 4.

At step 608, the datatype of the operand of the tokens is determined. In an embodiment of the present invention, the correlation and recognition unit 114 of the source code translation engine 104 is configured to determine a datatype of operands in the queries stored in the nodes of the updated abstract syntax tree. In an embodiment of the present invention, the various nodes of the updated abstract syntax tree are traversed and non-qualified expressions of the updated source code stored in the updated abstract syntax tree are identified. The non-qualified expression are the expressions where the child nodes of the query corresponding to the child node is unknown. In another embodiment of the present invention, the various nodes of the abstract syntax tree are traversed and the non-qualified operators and expressions of the nested queries stored in updated abstract syntax tree are identified.

At step 610, the abstract syntax tree is updated with the metadata from a source database. While traversing the updated abstract syntax tree, the correlation and recognition unit of the source code translation engine is configured to generate a 'temp map'. The 'temp map' is a temporary data structure that stores information about the datatype of each of the expressions of the nested queries of the updated source code. In an embodiment of the present invention, the metadata unit is configured to capture metadata information e.g. table format, column format, datatype etc. from the source database and is further configured to populate the captured metadata in the 'temp map'. After the 'temp map' is updated, the 'temp map' is used to populate the metadata into the updated abstract syntax tree such that the metadata is reflected in the updated abstract syntax tree.

In an embodiment of the present invention, the 'temp map' is compared with the metadata table based on the determined datatype of the operands. In another embodiment of the present invention, the metadata is populated from the metadata table into the 'temp map'. In an embodiment of the present invention, the metadata information e.g. table format, column format, datatype etc. is captured from the source database and the captured metadata is populated in the 'temp map'. In another embodiment of the present invention, the metadata unit is configured to traverse the updated abstract syntax tree and determine the metadata to be extracted from the source database corresponding to the tables used in the 'temp map'. After the updated 'temp map' is generated, it is used to update the abstract syntax tree such that the metadata is reflected in the abstract syntax tree.

At step 612, a syntax is identified corresponding to queries stored in the nodes of the updated abstract syntax tree. In an embodiment of the present invention, the updated abstract syntax tree is traversed and the syntax is identified corresponding to the queries stored in the nodes of the updated abstract syntax tree. In another embodiment of the present invention, the identified syntaxes are stored in form of syntax identifiers in a table corresponding to each syntax and query of the updated abstract syntax tree. The syntax may comprise of a unique set of guidelines like punctuation, spaces, mathematical operators, and special characters of the query. In another embodiment of the present invention, a recursive pattern of syntax is identified which comprises of groups of tokens.

At step 614, a scope is extracted out of the updated abstract syntax tree. In an embodiment of the present invention, the scope is extracted out of the updated abstract syntax tree. In another embodiment of the present invention, an analysis is performed of the different nodes of the updated abstract syntax tree to analyze the scope of the updated source code stored in the updated abstract syntax tree. During analysis, the tokens of the updated application source code stored in the updated abstract syntax tree are analyzed along with additional attributes e.g. name, type, scope, initialization etc. of the tables stored in the updated source code. For a multilevel nested subquery, the scope includes scope of a child node and a parent node of the query stored in the updated abstract syntax tree.

In another embodiment of the present invention, a scope of the tokens is identified in the updated queries stored in the updated abstract syntax and the scope of the updated queries and tokens is stored in a scope table with a scope identifier for each updated query and token. In an embodiment of the present invention, a recursive pattern is identified which comprises of group of tokens and a scope associated with the recursive patterns in the updated abstract syntax tree. In an embodiment of the present invention, a hierarchical analysis of different nodes is performed from the top node to the bottom node and left node to the right node of the updated abstract syntax tree to analyze the scope of the tokens i.e. the portion of a query in which that token is accessible. In an exemplary embodiment of the present invention, a source code language like Teradata supports dynamic scoping where the same token is re-defined within different sections of the same source code. In an embodiment of the present invention, the token re-definition is identified and the scoping of the token re-defined within the source code is stored in the scope table in form of the scope identifier.

At step 616, the tokens are concatenated for identification of the patterns. In an embodiment of the present invention, various tokens stored in the updated abstract syntax tree are concatenated recursively to generate a concatenated token string. In an embodiment of the present invention, the pattern is identified by matching the concatenated token string with respect to various preloaded patterns.

At step 618, the updated abstract syntax tree, the identified pattern, the scope table and the syntax table are traversed for translation of the updated abstract syntax tree into a cloud native application code. In an embodiment of the present invention, the identified pattern, the scope table and the syntax table are compared with each node of the updated syntax tree to translate the updated abstract syntax tree into cloud native code. In an embodiment of the present invention, the cloud native application code comprises cloud native queries that may be hosted on the cloud platform. In an embodiment of the present invention, the updated abstract syntax tree received from the correlation and recognition unit is traversed from top node to bottom node and then from left node to right node to compare the queries stored in the nodes with the identified pattern, the scope table and the syntax tree for translation of the queries stored in the updated abstract syntax tree into cloud native application code.

At step 620, the new tokens are concatenated to generate a cloud native code to be hosted on a cloud platform. In an embodiment of the present invention, the cloud native abstract syntax tree is traversed to generate a cloud native code to be hosted on the cloud platform.

Figure 7:
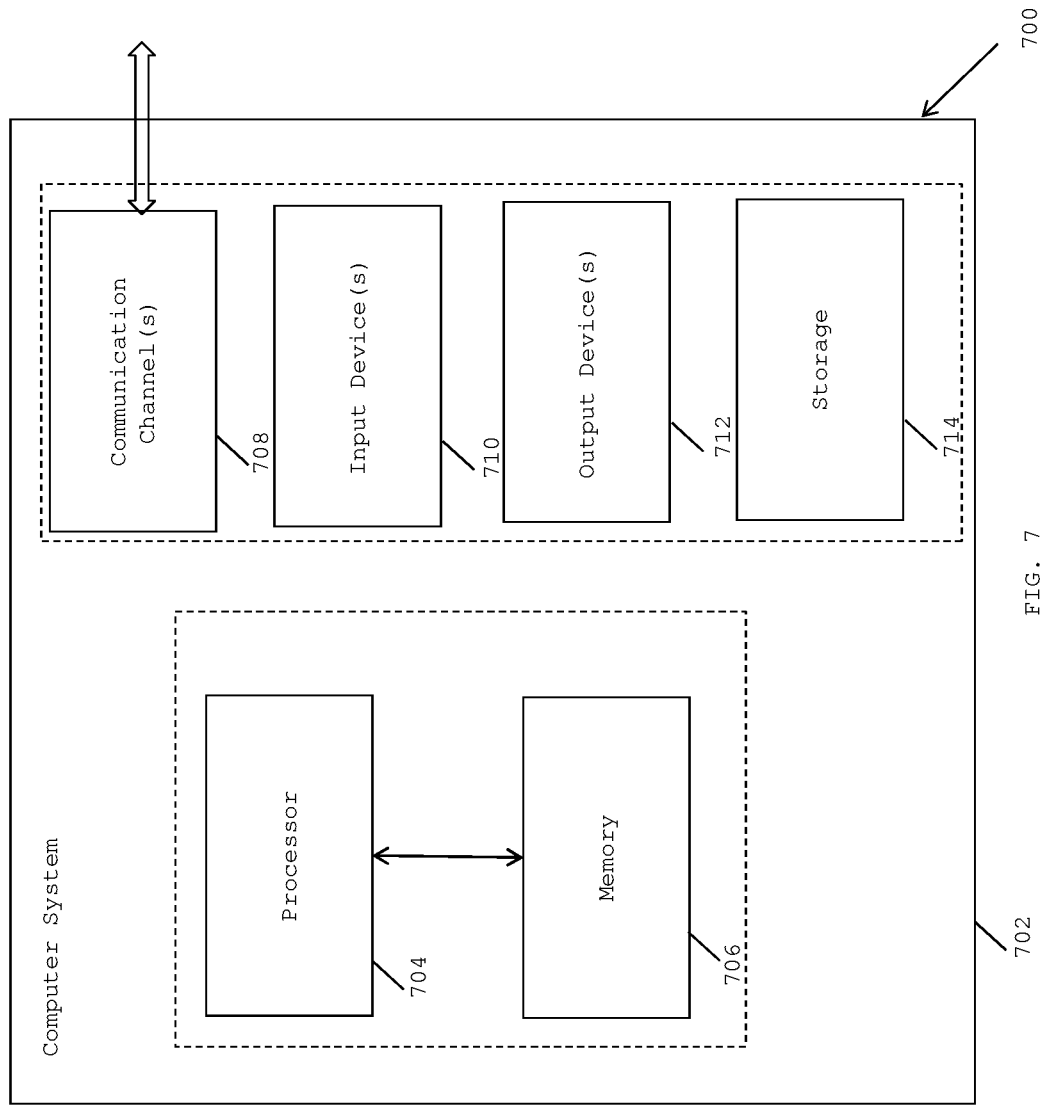
FIG. 7 illustrates an exemplary computer system in which various embodiments of the present invention may be implemented.

FIG. 7 illustrates an exemplary computer system in which various embodiments of the present invention may be implemented. The computer system 702 comprises a processor 704 and a memory 706. The processor 704 executes program instructions and is a real processor. The computer system 702 is not intended to suggest any limitation as to scope of use or functionality of described embodiments. For example, the computer system 702 may include, but not limited to, a programmed microprocessor, a micro-controller, a peripheral integrated circuit element, and other devices or arrangements of devices that are capable of implementing the steps that constitute the method of the present invention. In an embodiment of the present invention, the memory 706 may store software for implementing an embodiment of the present invention. The computer system 702 may have additional components. For example, the computer system 702 includes one or more communication channels 708, one or more input devices 710, one or more output devices 712, and storage 714. An interconnection mechanism (not shown) such as a bus, controller, or network, interconnects the components of the computer system 702. In an embodiment of the present invention, operating system software (not shown) provides an operating environment for various software executing in the computer system 702, and manages different functionalities of the components of the computer system 702.

The communication channel(s) 708 allow communication over a communication medium to various other computing entities. The communication medium provides information such as program instructions, or other data in a communication media. The communication media includes, but not limited to, wired or wireless methodologies implemented with an electrical, optical, RF, infrared, acoustic, microwave, Bluetooth or other transmission media.

The input device(s) 710 may include, but not limited to, a keyboard, mouse, pen, joystick, trackball, a voice device, a scanning device, touch screen or any another device that is capable of providing input to the computer system 702. In an embodiment of the present invention, the input device(s) 710 may be a sound card or similar device that accepts audio input in analog or digital form. The output device(s) 712 may include, but not limited to, a user interface on CRT or LCD, printer, speaker, CD/DVD writer, or any other device that provides output from the computer system 702.

The storage 714 may include, but not limited to, magnetic disks, magnetic tapes, CD-ROMs, CD-RWs, DVDs, flash drives or any other medium which can be used to store information and can be accessed by the computer system 702. In an embodiment of the present invention, the storage 714 contains program instructions for implementing the described embodiments.

The present invention may suitably be embodied as a computer program product for use with the computer system 702. The method described herein is typically implemented as a computer program product, comprising a set of program instructions which is executed by the computer system 702 or any other similar device. The set of program instructions may be a series of computer readable codes stored on a tangible medium, such as a computer readable storage medium (storage 714), for example, diskette, CD-ROM, ROM, flash drives or hard disk, or transmittable to the computer system 702, via a modem or other interface device, over either a tangible medium, including but not limited to optical or analogue communications channel(s) 708. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the internet or a mobile telephone network. The series of computer readable instructions may embody all or part of the functionality previously described herein.

The present invention may be implemented in numerous ways including as a system, a method, or a computer program product such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention.

We claim:

1. A system for translating a legacy source code to a cloud native code, wherein the system comprises:
 a memory storing program instructions;
 a processor executing program instructions stored in the memory; and
 a source code translation engine executed by the processor and configured to:
  receive a source code and derive a plurality of queries from the source code, wherein the queries comprise a plurality of tokens;
  construct an abstract syntax tree in the form of a data structure from the tokens;
  identify a syntax of the queries stored in the abstract syntax tree, wherein the syntax is stored in the form of syntax identifiers in a syntax table;
  identify a scope of the queries stored in the abstract syntax tree, wherein the scope is stored in the form of scope identifiers in a scope table;
  concatenate the tokens in the queries stored in the abstract syntax tree for identification of a pattern;
  traverse the abstract syntax tree, the identified pattern, the scope table and the syntax table for translation of the tokens of the abstract syntax tree into new tokens stored in the form of a cloud native abstract syntax tree;
  concatenate the new tokens stored in the cloud native abstract syntax tree to generate a translated cloud native code to be hosted on a cloud platform;
  wherein the source code translation engine comprises a metadata unit configured to populate captured metadata from a source database in the temporary map; and wherein the source code translation engine comprises a pattern directed translation unit configured to concatenate the tokens in the queries for identification of a pattern and generate a concatenated token string, wherein the pattern is identified by matching the concatenated token string with one or more pre-loaded patterns.

2. The system as claimed in claim 1, wherein the system comprises a derived column identification unit configured to derive a literal information relating to the queries or nested queries stored in the abstract syntax tree and update the abstract syntax tree based on the literal information.

3. The system as claimed in claim 1, wherein the system comprises a correlation and recognition unit configured to determine a datatype of operands of the tokens in the abstract syntax tree and update the abstract syntax tree with the metadata extracted from a source database based on the determined operand.

4. The system as claimed in claim 1, wherein the source code translation engine comprises a lexical analyser unit configured to receive a source code and derive the plurality of queries from the source.

5. The system as claimed in claim 1, wherein the source code translation engine comprises a parser unit configured to construct the abstract syntax tree from the queries in the form of the data structure.

6. The system as claimed in claim 1, wherein the source code translation engine comprises a grammar unit configured to identify the tokens and corresponding rules to be applied on the tokens and the operands associated with the tokens.

7. The system as claimed in claim 2, wherein the derived column identification unit is configured to resolve top-down usage of the derived literal information.

8. The system as claimed in claim 2, wherein the derived column identification engine is configured to generate a vector for the derived literal information, wherein the vector is used to update the abstract syntax tree.

9. The system as claimed in claim 1, wherein the datatype of a left token and right token of the operand is identified to apply an appropriate rule.

10. The system as claimed in claim 2, wherein system comprises a correlation and the recognition unit configured to identify non-qualified expression of an updated source code stored in the updated abstract syntax tree.

11. The system as claimed in claim 2, wherein the system comprises a correlation and recognition unit configured to generate a temporary map for storing information associated with a datatype of expressions of nested queries stored in the updated abstract syntax tree.

12. The system as claimed in claim 11, wherein the correlation and recognition unit is configured to compare the temporary map with a metadata table based on the datatype of a operand, wherein the temporary map is used to update the abstract syntax tree.

13. The system as claimed in claim 1, wherein the source code translation engine comprises a syntax identification unit to identify the syntax of the queries stored in the abstract tree by identifying a recursive pattern.

14. The system as claimed in claim 1, wherein the source code translation engine comprises a scope identification unit configured to identify the scope of the queries stored in the abstract tree by identifying a recursive pattern.

15. The system as claimed in claim 14, wherein the scope identification unit is configured to identify a token re-definition and store scoping of a redefined token in the scope table.

16. The system as claimed in claim 2, wherein the source code translation engine comprises a pattern directed translation unit configured to traverse the identified pattern, the scope table and the syntax table to translate the updated abstract syntax tree into the cloud native code.

17. A method for translating a legacy source code to a cloud native code executed by a processor comprising program instructions stored in a memory, the method comprising:
receiving a source code and deriving a plurality of queries from the source code, wherein the queries comprise a plurality of tokens;
constructing an abstract syntax tree in the form of a data structure from the tokens;
identifying a syntax of the queries stored in the abstract syntax tree, wherein the syntax is stored in the form of syntax identifiers in a syntax table;
identifying a scope of the queries stored in the abstract syntax tree, wherein the scope is stored in the form of scope identifiers in a scope table;
concatenating the tokens in the queries stored in the abstract syntax tree for identification of a pattern;
traversing the abstract syntax tree, the identified pattern, the scope table and the syntax table for translation of the tokens of the abstract syntax tree into new tokens stored in the form of a cloud native abstract syntax tree;
concatenating the new tokens stored in the cloud native abstract syntax tree to generate a translated cloud native code to be hosted on a cloud platform;
wherein the method comprises generating a temporary map for storing information about a datatype of expressions of the nested queries stored in the updated abstract syntax tree;
wherein the method comprises populating captured metadata from a source database in the temporary map; and
wherein the method comprises concatenating the tokens in the queries for identification of a pattern and generating a concatenated token string, wherein the pattern is identified by matching the concatenated token string with one or more pre-loaded patterns.

18. The method as claimed in claim 17, wherein the method further comprises deriving a literal information relating to the queries or nested queries stored in the abstract syntax tree and updating the abstract tree based on the literal information.

19. The method as claimed in claim 17, wherein the method comprises determining a datatype of operands of the tokens in the abstract syntax tree and updating the abstract syntax tree with the metadata extracted from a source database based on the determined operand.

20. The method as claimed in claim 17, wherein the method comprises identifying the tokens and corresponding rules to be applied on the tokens.

21. The method as claimed in claim 18, wherein the method comprises resolving a top-down usage of the derived literal information.

22. The method as claimed in claim 18, wherein the method comprises generating a vector for the derived literal information, wherein the vector is used to update the abstract syntax tree.

23. The method as claimed in claim 17, wherein the method comprises determining a datatype of operands in the queries stored in the nodes of the updated abstract syntax tree, wherein the datatype of a left token and a right token of the operand is identified to apply an appropriate rule.

24. The method as claimed in claim 18, wherein the method comprises identifying non-qualified expressions of an updated source code stored in the updated abstract syntax tree.

25. The method as claimed in claim 17, wherein the method comprises comparing the temporary map with a metadata table based on the datatype of an operand, wherein the temporary map is used to update the abstract syntax tree.

26. The method as claimed in claim 17, wherein the method comprises identifying the syntax of the queries stored in the abstract tree by identifying a recursive pattern, wherein the syntax is stored in the form of syntax identifiers in the syntax table.

27. The method as claimed in claim 17, wherein the method comprises identifying the scope out of the queries stored in the abstract tree by identifying a recursive pattern, wherein the scope is stored in the form of scope identifiers in the scope table.

28. The method as claimed in claim 17, wherein the method comprises identifying a token re-definition and storing a scoping of the redefined token in the scope table.

29. The method as claimed in claim 17, wherein the method comprises traversing the identified pattern, the scope table and the syntax table to translate an updated abstract syntax tree into a cloud native code.

30. A computer program product comprising:
a non-transitory computer readable medium having computer-readable program code stored thereon, the computer readable program code comprising instructions that, when executed by a processor, cause the processor to:
receive a source code and derive a plurality of queries from the source code, wherein the queries comprise a plurality of tokens;
construct an abstract syntax tree in the form of a data structure from the tokens;
identify a syntax of the queries stored in the abstract syntax tree, wherein the syntax is stored in the form of syntax identifiers in a syntax table;
identify a scope of the queries stored in the abstract syntax tree, wherein the scope is stored in the form of scope identifiers in a scope table;
concatenate the tokens in the queries stored in the abstract syntax tree for identification of a pattern;
traverse the abstract syntax tree, the identified pattern, the scope table and the syntax table for translation of the tokens of the abstract syntax tree into new tokens stored in the form of a cloud native abstract syntax tree;
concatenate the new tokens stored in the cloud native abstract syntax tree to generate a translated cloud native code to be hosted on a cloud platform;
wherein the source code translation engine comprises a metadata unit configured to populate captured metadata from a source database in the temporary map; and
wherein the source code translation engine comprises a pattern directed translation unit configured to concatenate the tokens in the queries for identification of a pattern and generate a concatenated token string, wherein the pattern is identified by matching the concatenated token string with one or more pre-loaded patterns.

* * * * *